United States Patent [19]

Heyes et al.

[11] Patent Number: 4,945,008
[45] Date of Patent: Jul. 31, 1990

[54] LAMINATED METAL SHEET

[75] Inventors: Peter J. Heyes, Wantage; Nicholas J. Middleton, Highworth, both of England

[73] Assignee: CMB Packaging (UK) Limited, Worcester, England

[21] Appl. No.: 377,836
[22] PCT Filed: Oct. 12, 1988
[86] PCT No.: PCT/GB88/00856
§ 371 Date: Jun. 9, 1989
§ 102(e) Date: Jun. 9, 1989
[87] PCT Pub. No.: WO89/03307
PCT Pub. Date: Apr. 20, 1989

[30] Foreign Application Priority Data

Oct. 15, 1987 [GB] United Kingdom ............... 8724242

[51] Int. Cl.$^5$ .................. B29C 35/02; B32B 1/10; B32B 15/08
[52] U.S. Cl. .................. 428/623; 428/626; 428/629; 428/667; 428/458; 428/476.3; 428/515; 156/69; 156/272.2; 156/273.5; 156/308.2; 156/309.9
[58] Field of Search ............... 428/623, 626, 629, 667, 428/458, 476.3, 515; 220/1 B C, 70, 83, 454, 455, 457; 156/69, 272.2, 272.4, 273.5, 274.4, 274.6, 274.8, 308.2, 309.6, 309.9

[56] References Cited

U.S. PATENT DOCUMENTS

| | | | |
|---|---|---|---|
| 4,009,312 | 2/1977 | Hayashi et al. | 428/458 |
| 4,058,647 | 11/1977 | Inoue et al. | 156/308.2 |
| 4,504,531 | 3/1985 | Murata et al. | 428/458 |
| 4,741,957 | 5/1988 | Park | 428/476.3 |
| 4,762,737 | 8/1988 | Lu | 428/476.3 |
| 4,810,434 | 3/1989 | Caines | 156/272.2 |

Primary Examiner—Theodore Morris
Assistant Examiner—George Wyszomierski
Attorney, Agent, or Firm—Burns, Doane, Swecker & Mathis

[57] ABSTRACT

A laminated metal sheet having adhered to one of its major surfaces a composite co-extruded polyolefin-containing film (B) comprising a plurality of layers in the following order:

(B1) an inner layer of a bonding resin which is an acid modified polyolefin resin containing carboxyl or anhydride groups,
(B2) a layer of a polyolefin,
(B3) a further layer of a bonding resin which is as defined for layer (B1), and
(B4) a layer of a polyamide.

The laminates of the invention are useful for forming into containers or various components therefor.

32 Claims, 2 Drawing Sheets

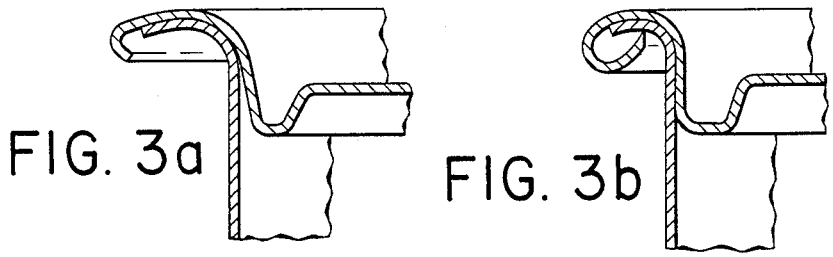
FIG. 3a    FIG. 3b
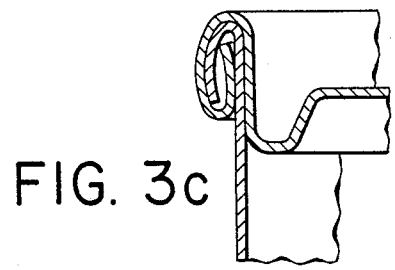
FIG. 3c
FIG. 4
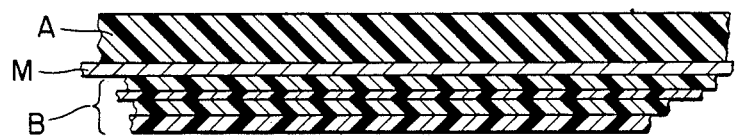
FIG. 5
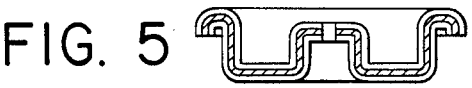
FIG. 6
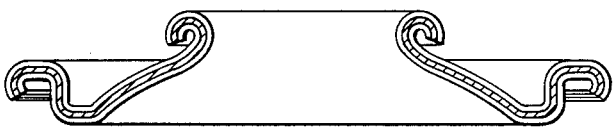
FIG. 7

LAMINATED METAL SHEET

The present invention relates to laminated metal sheet and to a process for producing laminated metal sheet.

Lamination of polymer materials to metal sheet such as metal strip is a well known and well documented technique. The resultant laminates have many applications such as, for example, use for the manufacture of can bodies and can ends for containers for foodstuffs and beverages, and end components and valve cups for aerosol containers.

The lamination of polyolefin film to metal sheet has been described in many patents. However, although polyolefin coatings have many useful attributes, they have significant limitations as can coatings. Thus, for example, polypropylene or polyethylene coatings such as those described in GB No. 1324952 and EP No. 0062385 impart acceptable corrosion resistance to the metal sheet but are relatively soft, damage easily, have low melting points and relatively low gloss.

Polypropylene and polyethylene coatings are relatively soft materials compared with conventional lacquers used in can stock coating. The softness of polyolefin coatings results in a tendency for the coatings to fibrillate when laminates incorporating such coatings are subjected to can end double seaming. Although the polyolefin coating forms well, it is found to develop unacceptable polymer filaments on the extremities of the seaming panel.

For many applications it is necessary to use relatively thick polyolefin coatings. Thus, when it is desired to incorporate white pigments in a polyolefin coating so as to obtain a white external coating on a can body or a can end, it is found necessary to utilize a relatively thick polypropylene layer, suitably pigmented, in order to achieve acceptable opacity and appearance. However, increasing the thickness of the polyolefin coating tends to exacerbate the problem of fibrillation mentioned above, and thick white polypropylene coatings are found to fibrillate when subjected to double seaming in a can making process. This is a considerable disadvantage.

A further disadvantage of white pigmented polyolefin coated metal sheet is that such sheet is not readily susceptible to draw redraw processes for manufacturing cans nor for use in the manufacture of partially wall ironed cans. Such processes tend to disrupt the polyolefin coatings on the metal sheet and the resultant cans are found to be unsuitable for packaging human food products. Cans made by such processes are found to have limited shelf life and corrode quickly when packed with human food products.

We have now found that by forming composite polyolefin film incorporating an external polyamide layer, the above-mentioned problems and disadvantages can be overcome.

Accordingly the present invention provides a laminated metal sheet having adhered to one of its major surfaces a composite co-extruded polyolefin-containing film (B) comprising a plurality of layers in the following order:

(B1) an inner layer of a bonding resin which is an acid modified polyolefin resin containing carboxyl or anhydride groups, (B2) a layer of a polyolefin, (B3) a further layer of a bonding resin which is as defined for layer (B1), and (B4) a layer of a polyamide.

We have found that the four layer composite film used in the laminates of the present invention has excellent lamination characteristics. The laminates of the present invention can readily be formed into draw redraw cans or partially ironed cans. The composite film laminated to the metal sheet is found to provide excellent protection to the metal sheet whether used as an internal coating or external coating.

This is a surprising attribute of the laminates of the invention given that when the laminates are formed into cans, the polyamide layer is in direct contact with aqueous media and is unprotected from moisture.

Furthermore, the composite film used in the present laminates does not have the fibrillation problems encountered with prior polyolefin coatings.

The polyamide layer (B4) in the laminated metal sheet of the invention is preferably Nylon 6, Nylon 66, Nylon 11 or Nylon 12.

Preferably the polyolefin in layer (B2) is polypropylene, or polyethylene, or an ethylene-propylene copolymer. If desired other polyolefins such as polymethyl pentene may be used.

The bonding resin in each of layers (B1) and (B3) is an acid-modified polyolefin resin containing carboxyl or anhydride groups. Typical acids for use in preparing such acid-modified polymers are ethylenically unsaturated carboxylic acids such as acrylic acid, methacrylic acid, maleic acid, fumaric acid, crotonic acid, and itaconic acid. Typical anhydrides used for the same purpose are ethylenically unsaturated carboxylic anhydrides such as maleic anhydride. The acid groups can be present as copolymers of ethylene, for example ethylene/acrylic acid (EAA) or ethylene/methacrylic acid (EMMA). Typically the acid concentration is 5 to 15%.

The acid modification of the acid modified polymers can be obtained, for example, by grafting maleic anhydride to a polyolefin such as polypropylene, polyethylene, ethylene-propylene or ethylene-vinylacetate copolymer. The graft can be introduced by techniques such as reacting maleic anhydride with polyolefin in solution in an organic solvent and using a free radical catalyst such as dibenzoyl peroxide or dicumyl peroxide. Alternatively, an active centre can be introduced into the polymer by using high energy radiation such as gamma rays or X-rays and then reacting the resultant material with the anhydride.

The anhydride graft-modified polyolefin can be diluted with further unmodified polyolefin to produce a bonding resin preferably having a content of grafted acid (i.e. a graft level) of 0.02 to 0.6%, most preferably 0.2±0.05% measured by analysis of infra red adsorption at 1790 cm$^{-1}$, of resin pre-dried at 200° C. to convert acid functionality to anhydride functionality. The diluting unmodified polyolefin can be the same polyolefin which has been used to produce the acid modified polyolefin, or it can be a different polyolefin. Thus, for example, an acid modified low-density polyethylene (LDPE) or linear low-density polyethylene (LLDPE) can be diluted with polypropylene, or an acid modified polypropylene can be diluted with a polypropylene or an ethylene propylene random copolymer.

The purpose of the inner layer (B1) of bonding resin is to tie the layer (B2) of polyolefin to the metal surface. When the polyolefin layer (B2) is a polyethylene, the bonding resin base of the inner tie layer (B1) is preferably a polyethylene or an ethylene copolymer. When the polyolefin layer (B2) is a polypropylene homopolymer or an ethylene-propylene copolymer, the bonding resin base of inner tie layer (B1) is preferably a polypropylene or an ethylene propylene random copolymer.

The purpose of layer (B3) of bonding resin is to tie the outer polyamide layer (B4) to the polyolefin layer (B2); the bonding resin layer (B3) is preferably based on polyethylene or polypropylene.

Preferably, for a bonding resin layer based on polypropylene, the bonding resin melt flow index is 3 to 30 gm/10 minutes, measured at 230° C. by the ASTM test No. D1238.

Particularly preferred bonding resin layers are based on random ethylene-propylene copolymers or blends of low-density polyethylene (LDPE) with polypropylene or blends of linear low-density polyethylene (LLDPE) with polypropylene.

A particularly preferred acid modified olefin copolymer is maleic-anhydride modified ethylene vinyl acetate.

The layer (B1) of bonding resin in the composite polymer film (B) is preferably continuous and of a thickness of from 1 to 10 microns, more preferably 2 to 5 microns.

The layer (B3) of bonding resin in the composite polymer film (B) is preferably continuous and of a thickness of from 1 to 10 microns, more preferably 2 to 5 microns.

If desired, any of layers (B1) to (B4) may be pigmented in conventional manner, with titanium dioxide for example. The preferred arrangement is for pigment to be in layer (B2) or in layers (B2) and (B4). Preferably the outer polyamide layer (B4) may contain inorganic anti-blocking agents such as synthetic silica having a particle size of from 0.5 to 5 microns.

Particularly preferred laminates in accordance with the invention are those laminates which further comprise a film (A) of a thermoplastic polymer adhered to the other major surface of the metal sheet. The thermoplastic polymer (A) may be a composite film containing one or more of polyester, polyolefin or polyamide resins.

Typically, the thermoplastic polymer film (A) may be a composite polyester film comprising a thinner inner layer (A1) of a substantially non-crystalline (i.e. amorphous) linear polyester which has a softening point below 150° C. and a melting point above 150° C. but below 240° C. and a thicker outer layer (A2) having a melting point above 220° C., and preferably having an intrinsic viscosity of from 0.5 to 1.1, preferably 0.6 to 0.8. The composite polyester film (A) is preferably one which has been prepared by co-extrusion prior to application to the metal strip.

Preferably the polymer film A is biaxially oriented polyester such as polyethylene terephthalate. Preferably the inner layer (A1) is a linear copolyester, for example an amorphous copolymer of approximately 80 mole % ethylene terephthalate and approximately 20 mole % ethyleneisophthalate. Copolyesters of terephthalic acid and two alcohols, for example ethylene glycol and cyclohexane-dimethanol, are also suitable for use as the inner layer (A1).

Typically, the biaxially oriented polyester in outer layer (A2) has a crystallinity greater than 30%, preferably from 40 to 50%.

The crystallinity of a polyester material can be estimated by X-ray diffraction techniques as described in GB No. 1566422 or from measurement of density and applying the relationship:

$V_c = (P-Pa)(Pc-Pa)^{-1}$ where
$V_c$ = Volume fraction crystallinity,
P = density of sample,
$P_a$ = density of amorphous material,
$P_c$ = density of crystalline material.

P can be measured in a density column using zinc chloride/water or n-heptane/carbon tetrachloride mixtures.

The biaxially oriented film which may be used as the outer layer may be formed by stretching the amorphous extruded polymer in the forward direction at temperatures above the glass transition temperature of the polymer by a factor of 2.2 to 3.8 and similarly in the transverse direction by 2.2 to 4.42. Where the laminated coating is to be used in deep drawing metal containers, the orientation is preferably limited to stretching by a factor approximately 2.5 in both forward and transverse directions.

Typically the inner layer (A1) should be continuous and have a typical thickness of about 2 to 5 microns. The ratio of the thickness of the outer polyester layer (A2) to the inner polyester layer (A1) is between 12 and 4, with the total thickness of the combined layers being from 12 to 25 microns.

If desired, the polyester layers may contain inorganic anti-blocking agents such as synthetic silica having an average particle size of from 0.5 to 5 microns.

Also, if desired, the outer polyester layer (A2) may be pigmented using conventional pigments such as titanium dioxide.

The principal function of the inner polyester layer (A1) is to heat seal to the metal surface at temperatures below the melting point of the outer polyester layer (A2). It is important that the inner layer should retain its amorphous nature after orientation and heat setting of the film. Furthermore the inner polyester layer (A1) should bond to the metal at temperatures which are compatible with the simultaneous lamination to the opposite side of the metal sheet of the polyolefin containing coating (B). This requirement is met by ensuring that the inner layer of polyester (A1) has a softening point compatible with the temperatures needed to laminate a wide range of polyolefin or based coatings. For this purpose the softening point should be lower than 150° C., typically not greater than 130° C.

Alternatively the thermoplastic polymer film A may be a polyolefin or polyamide containing composite film.

Polyolefin films are preferably coextrusions of polypropylene (A2) and a bonding resin (A1). The polypropylene may be a homopolymer or ethylene propylene copolymer and preferably contain up to 1% of synthetic silica anti-blocking pigment. The bonding resin (A1) is an acid modified polyolefin preferably a maleic anhydride graft modified polypropylene or ethylene propylene copolymer, preferably containing 0.02 to 0.6% maleic anhydride, most preferably 0.2±0.05%.

Composite polyolefin and polyamide containing films may be used, containing acid-modifed polyolefin bonding resins. In general the composite polyamide/polyolefin film will comprise; bonding resin/polyamide/bonding resin/polyolefin or bonding resin/polyolefin/bonding resin/polyamide or bonding resin/polyamide.

The nature of the bonding resin is described in more detail in our U.K. patent application No. 8724238.

The polyolefin or polyamide containing film A may be pigmented in one or more of its layers.

Preferably composite films (A) and (B) are films which have been prepared by co-extrusion.

The metal substrate to which the polymer films are applied, typically in the form of metal strip, is generally steel or aluminium or alloys thereof, typically a steel or aluminium based product used in the packaging industry.

The gauge range is typically 0.05 mm to 0.4 mm for steel and 0.02 mm to 0.4 mm for aluminium.

The steel may be coated with tin, preferably passivated by conventional chromic treatments or alternatively may be in the form of nickel or zinc plated steel, blackplate or phosphated blackplate, which is preferably chromate rinsed after phosphating.

The preferred steel finish is electrolytically chromium coated steel (ECCS) with a dual layer of chromium metal and chromium oxide. With such steels, the chromium metal and chromium oxide levels can vary widely. Typically, the chromium metal content ranges from 0.1 to 0.20 gm/m$^2$, while the chromium oxide ranges from 0.005 to 0.05 gm/m$^2$. The ECCS is commonly derived from deposition systems containing either sulphur containing or fluorine containing catalysts.

The laminated metal sheet of the present invention may be prepared by laminating to the metal sheet a polymer film (B), or polymer films (A) and (B), as defined above, by use of conventional laminating techniques.

However, laminated metal sheet in accordance with the invention is preferably prepared by a thermal lamination process in which both polymer films (A) and (B) are applied simultaneously to the metal sheet. This preferred simultaneous lamination process constitutes a further aspect of the present invention.

Thus, according to a further aspect of the present invention there is provided a process for producing a laminated metal sheet carrying on one major surface thereof a polyolefin-containing film (B) as defined above and on the other major surface thereof a thermoplastic polymer film (A) as defined above, which process comprises laminating to one of the major surfaces of the metal sheet the said film (A) while simultaneously laminating the said film (B) to the other major surface of the metal sheet, the metal sheet having been heated to a temperature $T_1$ sufficient to cause softening of the polymer films and intimate contact thereof with the metal sheet, the temperature $T_1$ being below the temperature at which the outer surface of the films is damaged during lamination, and re-heating the resultant laminate to a temperature $T_2$ sufficient to cause each of the polymer films (A) and (B) to interact with and become bound to the respective surface of the metal sheet.

This type of simultaneous thermal lamination process is also the subject of our U.K. patent application No. 8724237.

The process of the present invention is carried out in a number of stages in a first stage, the metal is preheated to a temperature $T_1$ in the range of 120°–250° C., preferably 160°–200° C., such that the outer surface of film (B) is not raised above its melting point in the lamination nip, and preferably not above its softening point.

In a second stage, the films and metal are brought together in a lamination nip thereby establishing intimate and uniform, wrinkle-free, contact.

In a third stage, the resultant laminate is re-heated, preferably by induction heating the metal core to a temperature $T_2$ of from 200°–350° C., and below the thermal or oxidative degradation point of the outer face of the polyolefin containing film (B) or the temperature at which the outer layer physically degrades when quenched rapidly with water. If desired, infra-red heating may be used.

With the metal core above the melting point of the films, rapid interaction occurs between the metal, the inner surface of film (A) and the polyolefin layer (B). In order to achieve this interaction, the laminate is held above approximately 230° C. for 1 to 30 seconds, preferably at about 250° C. for 2 seconds, and thereafter the laminates is rapidly and uniformly quenched by water to a temperature below the softening point of the resin having the lowest softening temperature.

In general, for simultaneous lamination, the temperature $T_1$ is chosen to match the characteristics of both films, A and B, with the lowest ideal temperature for lamination selected for the simultaneous lamination, $T_1$.

The precise temperature $T_1$ to which the metal sheet should be heated prior to lamination depends both on the thickness of the films to be laminated and also on the chemical nature of the said films. Thus for films A, temperatures of approximately 120° C. and above, typically 140° C., are suitable for a 20 micron cast polypropylene film, up to 230° C. for a thicker 200 micron cast polypropylene film. Temperatures of 140° C. to 270° C. are suitable for coextruded biaxially oriented polyethylene terephthalate. Polyamide containing films will tolerate slightly higher metal temperatures than cast polypropylene and oriented polypropylene demands a higher temperature than cast polypropylene, typically 200° C. for a 20 micron film.

The temperature $T_2$ to be used on re-heating the laminate downstream of the lamination nip is typically in the range 230° to 270° C. The exact temperature to be used will depend on the dwell time before the laminate is quenched. Temperatures higher than 270° C. lead to physical damage of the polyolefin film when it comes into contact with quench water and lead to melting of polyethylene terephthalate films. The temperature at the lower end of the said range is determined by the need to achieve a satisfactory bond strength between the metal sheet and the polymer films attached thereto in the very short time during which the laminate is heated to the required temperature. Commercial operations generally demand a dwell time of approximately two seconds only.

If the film A is a biaxially oriented polyester, the temperature in the post lamination zone can be varied to control the properties, particularly formability, which are desired in a polyester coating (A). Such control can be achieved quite readily if induction heating is used to re-heat the laminate downstream of the lamination nip. Preferably a suitable pyrometer may be used to identify the temperature of the polyester. Alternatively, devices that recognise the change from biaxial orientation to crystalline non-oriented or amorphous polyester may be used to indicate the critical state of the polyester film (for example, an X-ray diffractomater).

By means of the process of the present invention both polymer coatings (A) and (B) can be applied simultaneously while avoiding the use of solvent containing, environmentally undesirable, adhesives.

Surprisingly it is found that while two layer composite films comprising a polyamide (e.g. Nylon) layer and a maleic anhydride grafted polyolefin tie or bonding layer suffer blistering when subjected to water quenching after the second heating stage of the thermal lamination process of the present invention, the four-layer coatings of the invention have excellent lamination characteristics and do not suffer blistering or changes in surface appearance when thermally laminated by the process of the present invention.

Additionally, the four layer coatings of the invention have improved surface temperature resistance compared to polyethylene or polypropylene based coatings. Coated metal laminates employing the four layer coatings of this invention have better deep drawing characteristics and improved double seaming behaviour compared to polypropylene or polyethylene based laminates. Cans and end components manufactured from laminates of the invention have longer shelf life and better food or beverage product corrosion resistance than laminates having polypropylene or polyethylene coatings.

The laminates of the invention may be used for food can end components, deep drawn and draw redraw can bodies, draw and wall ironed can bodies, beverage can ends, aerosol can end components (cone, dome and valve cup) and a variety of can end closures and components.

Throughout this specification, intrinsic viscosities are measured at 25° C. in O-chlorophenol solutions at a concentration of 5 g/l.

The present invention will now be described in further detail, by way of example only, with reference to the following Examples, and with reference to the following drawings, in which:

FIGS. 3a, 3b and 3c depict diagrammatically various stages in the formation of a double seam from laminates in accordance with the invention;

FIG. 4 is a section taken through a laminate of the type shown in FIG. 1, but containing an additional thermoplastic film (A) laminated to the opposite major surface of the metal strip (M); and FIGS. 5, 6 and 7 show components for aerosol containers (i.e. an aerosol cup, an aerosol cone, and an aerosol dome respectively) made from a laminate in accordance with the present invention.

EXAMPLES 1 TO 10

Figure 1:
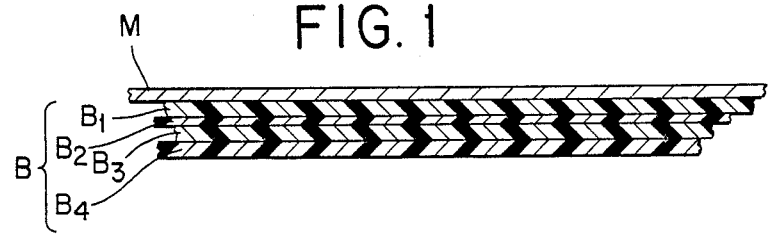
FIG. 1 is a section taken through a laminate in accordance with the invention and comprising a composite multi-layered polymer film (B) laminated to a metal strip (M)

Thermoplastic polymer films (A) and (B) having structures as described in Table 1 were applied simultaneously to a metal strip (M) by a thermal lamination process. The thickness and composition of each of the polymer films and that of the metal strip are shown in Table 1.

The laminates were prepared by a simultaneous thermal lamination process such as that described in more detail in our U.K. patent application No. 8724237.

Typically, laminates were prepared by heating the metal strip (M) to a temperature of 140°–180° C. and films (A) and (B) were brought into intimate wrinkle free contact with the metal via a pair of lamination rolls. The laminate was heated indirectly to a temperature of 250° to 270° C. and held above 230° C. for two seconds before rapidly and uniformly quenching the laminate with cold water. The laminate was dried with a blast of cold air.

The temperatures used in this process to prepare the laminates of Examples 1 to 10 are shown in Table 2.

The laminates of Examples 2, 3, 5, 7 and 9 are embodiments of the present invention while those of Examples 1, 4, 6, 8 and 10 are given for the purpose of comparison.

Comparison of Examples 1 and 2 in Table 2 shows that the four layer film of the invention (Example 2) laminates successfully whilst a nylon based film blisters under similar conditions (as shown in Example 1).

TABLE 1

| COMPOSITION OF METAL/POLYMER LAMINATE | | | | |
| --- | --- | --- | --- | --- |
| Example | Film B | | Film A | Metal (m) |
| 1 | B1: Bond Resin 1 | (5 μ) | PET (15 μ) | 0.21 mm ECCS |
|  | B2: Nylon 6 | (25 μ) |  | 450 N/mm² |
| 2 | B1: Bond Resin 1 | (3 μ) | PET (15 μ) | 0.21 mm ECCS |
|  | B2: Polypropylene | (19 μ) |  | 450 N/mm² |
|  | B3: Bond Resin 1 | (3 μ) |  |  |
|  | B4: Nylon 6 | (5 μ) |  |  |
| 3 | B1: Bond Resin 1 | (3 μ) | Bond Resin 1 (3 μ) | 0.21 mm ECCS |
|  | B2: Polypropylene containing titanium dioxide | (29 μ) | Polypropylene (37 μ) | 450 N/mm² |
|  | B3: Bond resin | (3 μ) |  |  |
|  | B4: Nylon 6 containing 7% wt titanium dioxide | (5 μ) |  |  |
| 4 | B1: Bond Resin 1 | (3 μ) | Bond Resin 1 (3 μ) | 0.21 mm ECCS |
|  | B2: Polypropylene containing 20% wt titanium dioxide | (37 μ) | Polypropylene (37 μ) | 450 N/mm² |
| 5 | As 3B |  | As 3B | 0.21 mm ECCS 360 N/mm² |
| 6 | As 4B |  | As 4B | 0.21 mm ECCS 360 N/mm² |
| 7 | As 3B |  | PET (15 μ) | 0.317 mm aluminium 3004 alloy (H19) |
| 8 | As 4B |  | PET (15 μ) | 0.317 mm aluminium alloy 3004 (H19) |
| 9 | As 3B |  | Bond Resin 1 (2 μ) Polypropylene containing 5000 ppm synthetic silica (18 μ) | 0.21 mm ECCS 450 N/mm² |

TABLE 1-continued

| COMPOSITION OF METAL/POLYMER LAMINATE | | | |
|---|---|---|---|
| Example | Film B | Film A | Metal (m) |
| 10 | As 4B | As 9A | 0.21 mm ECCS 450 N/mm$^2$ |

Key to Table 1:
1. Bond Resin 1 is a maleic anhydride graft modified ethylene propylene random copolymer containing 0.2 ± 0.05% maleic anhydride.
2. Polypropylene is a polypropylene homopolymer.
3. PET is a biaxially oriented coextruded film having an outer layer of PET and an inner layer of a copolymer of ethylene isophthalate (20%) and ethylene terephthalate (80%).

TABLE 2

| | LAMINATION CONDITIONS | | |
|---|---|---|---|
| Example | Metal Temperature Before Nip (°C.) | Laminate Temperature After Second Stage Heating (°C.) | Comment |
| 1 | 180 | 250 | Blisters in quenching |
| 2 | 180 | 250 | Satisfactoy |
| 3 | 160 | 250 | " |
| 4 | 160 | 250 | " |
| 5 | 180 | 250 | " |
| 6 | 160 | 250 | " |
| 7 | 180 | 270 | " |
| 8 | 180 | 270 | " |
| 9 | 140 | 250 | " |
| 10 | 140 | 250 | " |

Notes:
1. All laminates were quenched by cold water two seconds after reaching 250° C. The quench was achieved by a linear flow of water onto the strip, free from spray.
2. Metal and laminate were heated by induction (Examples 1 to 6, 9, 10) and infra-red (7, 8).

The laminates of Examples 3 to 10 were formed into various components for containers such as food can ends, draw-redraw food cans, and draw wall-ironed beverage cans. The nature of the various components and their performance is set out in Table 3.

TABLE 3

Figure 2A:
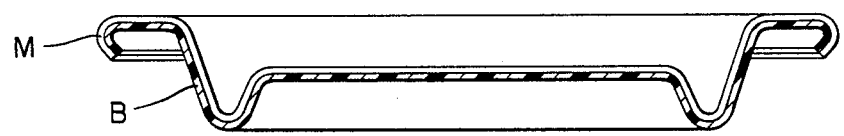
FIG. 2a is a sectional side elevation of a can end made from the laminate of FIG. 1.
Figure 2B:
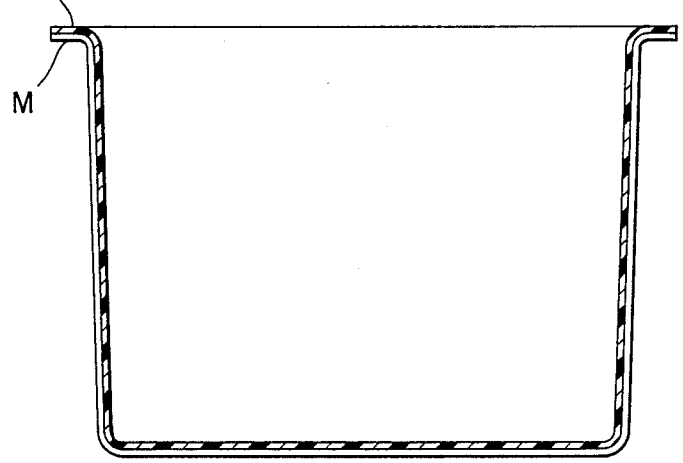
FIG. 2b is a sectional side elevation of a can body deep drawn from the laminate of FIG. 1.

| COMPONENTS FORMED FROM LAMINATES | | | |
|---|---|---|---|
| Laminate Type | Component | Inside Coating | Performance |
| Example 3 | 73 mm diameter food can end (FIG. 2a) | Film A | External coating resists fibrillation and damage in double seaming. |
| Example 4 | 73 mm diameter food can end (FIG. 2a) | Film A | External coating fibrillates at the top of the seaming panel. |
| Example 5 | 54 mm diameter 70 mm height Draw-redraw food can (FIG. 2b) | Film A | Can forming is successful at 750 cans per minute manufacturing speeds. |
| Example 6 | 54 mm diameter 70 mm height Draw-redraw food can (FIG. 2b) | Film A | Cans suffer frequent failures to draw to full height at 750 cans per minute manufacturing speed. |
| Example 7 | 68 mm diameter 120 mm height Draw wall-ironed beverage can. | Film A | Full Height can formed satisfactorily. |
| Example 8 | As 7 | Film A | Material formed cup satisfactorily but failed in ironing. |
| Example 9 | 73 mm diameter food can end (FIG. 2a) | Film B | Excellent shelf life with wide range of human food products. |
| Example 10 | 73 mm diameter food can end (FIG. 2a) | Film B | Some underfilm corrosion at deformed areas. |

The results given in Table 3 illustrate some of the advantages of the laminates of the present invention.

Thus, Examples 3 and 5 illustrate the excellent formability of laminates produced from laminates in accordance with the invention. By comparison, similar films without Nylon (as illustrated by Examples 4 and 6) have poor formability.

Examples 3 and 9 illustrate the improvements in double seaming of external white coatings and shelf life of white internal coatings conferred by the laminates of the invention as compared to laminates having no Nylon layer (as exemplified by Examples 4 and 10).

We claim:

1. A laminated metal sheet having adhered to one of its major surfaces a composite co-extruded polyolefin-containing film (B) comprising a plurality of layers in the following order:
   (B1) an inner layer of a bonding resin which is an acid modified polyolefin resin containing carboxyl or anhydride groups,
   (B2) a layer of a polyolefin,
   (B3) a further layer of a bonding resin which is as defined for layer (B1), and
   (B4) a layer of a polyamide.

2. A laminate according to claim 1, wherein the polyamide layer (B4) is Nylon 6, Nylon 66, Nylon 11 or Nylon 12.

3. A laminate according to claim 1, wherein the polyolefin layer (B2) is polypropylene, polyethylene or an ethylene-propylene copolymer, or polymethyl pentene.

4. A laminate according to claim 1, wherein layers (B2) and/or (B4) contain a pigment.

5. A laminate according to claim 1, wherein the bonding resin of layer (B1) and/or (B3) is chosen from a maleic anhydride modified propylene, maleic anhydride modified ethylene-propylene copolymer, maleic anhydride modified polyethylene, or maleic anhydride modified ethylene-vinylacetate copolymer.

6. A laminate according to claim 5, wherein the maleic anhydride content of the polymer is from 0.05 to 0.5%.

7. A laminate according to claim 5, wherein the maleic anhydride content of the binding resin is from 0.1 to 0.25%.

8. A laminate according to claim 1, wherein the bonding resin of layer (B1), (B3), or both (B1) and (B3) is chosen form an ethylene-acrylic acid polymer or an ethylene-methacrylic acid copolymer.

9. A laminate according to claim 1, further comprising a film (A) of a thermoplastic polymer adhered to the other major surface of the metal sheet.

10. A laminate according to claim 8, wherein the firm (A) is a composite polyester film comprising an inner layer (A1) of a substantially non-crystalline linear polyester having a softening point below 150° C. and a melting point above 150° C. but below 240° C. and an outer layer (A2) of a linear polyester having a melting point above 220° C.

11. A laminate according to claim 10, wherein the polyester of inner layer (A1) is a copolymer of ethylene terephthalate and ethylene isophthalate, or a copolymer formed from terephthalic acid and two alcohols.

12. A laminate according to claim 11, wherein the mole ratio of ethylene terephthalate to ethylene isophthalate is 80:20.

13. A laminate according to claim 10, wherein film A is a biaxially oriented polyester.

14. A laminate according to claim 13, wherein the polyester of outer layer (A2) has a crystallinity greater than 30%.

15. A laminate according to claim 13, wherein the polyester of outer layer (A2) has a crystallinity from 40 to 50%.

16. A laminate according to claim 10, wherein the outer layer (A2) is polyethylene terephthalate.

17. A laminate according to claim 10, wherein the polyester of inner layer (A1) is a copolymer of ethylene terephthalate and ethylene isophthalate, or a copolymer formed from terephthalic acid and ethylene glycol and cyclohexane-dimethanol.

18. A laminate according to claim 17, wherein the mole ratio of ethylene terephthalate to ethylene isophthalate is 80:20.

19. A laminate according to claim 10, wherein the outer layer (A2) is biaxially oriented polyethylene terephthalate.

20. A laminate according to claim 1, wherein the metal sheet is steel coated with a layer of chromium metal, followed by a layer of chromium oxide.

21. A laminate according to claim 1, wherein the metal sheet is aluminium.

22. A laminate according to claim 1, wherein layers (B2) and/or (B4) contain titanium dioxide segment.

23. A laminate according to claim 1, wherein the bonding resin of layer (B1), (B3), or both (B1) and (B3) is chosen from an ethylene-acrylic acid copolymer or an ethylene-methacrylic acid copolymer containing from 5 to 15% by weight of acid.

24. A container or a component for a container formed from a laminated metal sheet having adhered to one of its major surfaces a composite co-extruded polyolefin-containing film (B) comprising a plurality of layers in the following order:
   (B1) an inner layer of a bonding resin which is an acid modified polyolefin resin containing carboxyl or anhydride groups,
   (B2) a layer of a polyolefin,
   (B3) a further layer of a bonding resin which is as defined for layer (B1), and
   (B4) a layer of a polyamide.

25. A process for producing by simultaneous lamination a polymer/metal/polymer laminate comprising a metal sheet or strip having adhered to one major surface thereof a composite co-extruded polyolefin-containing film (B) comprising a plurality of layers in the following order:
   (B1) an inner layer of a bonding resin which is an acid modified polyolefin resin containing carboxyl or anhydride groups,
   (B2) a layer of a polyolefin,
   (B3) a further layer of a bonding resin which is as defined for layer (B1), and
   (B4) a layer of a polyamide, and having adhered to the other major surface thereof a film (A) of a thermoplastic polymer, which process comprises laminating to one of the major surfaces of the metal sheet the said film (A) while simultaneously laminating the said film (B) to the other major surface of the metal sheet, the metal sheet having been heated to a temperature $T_1$ sufficient to cause softening of the polymer films and intimate contact thereof with the metal sheet, the temperature $T_1$ being below the temperature at which the outer surface of the films is damaged during lamination, and re-heating the resultant laminate to a temperature $T_2$ sufficient to cause each of the polymer films (A) and (B) to interact with and become bound to the respective surface of the metal sheet.

26. A process according to claim 25, wherein the temperature $T_1$ is from 120 to 250° C.

27. A process according to claim 25, wherein the laminate is reheated by induction heating means.

28. A process according to claim 25, wherein the laminate is reheated by infra-red heating means.

29. A process according to claim 18, wherein the temperature $T_2$ is from 200 to 350° C.

30. A process according to claim 29, wherein the temperature $T_2$ is in the range 210° to 350° C. and the laminate is then held above 200° C. for at least 1 second after which it is quenched.

31. A process according to claim 30, wherein the laminate is quenched rapidly and uniformly.

32. A process according to claim 30, wherein the laminate is quenched rapidly and uniformly by immersion in a tank of water or by line quenching with water.

* * * * *